United States Patent
Mestman et al.

(10) Patent No.: US 11,700,180 B2
(45) Date of Patent: *Jul. 11, 2023

(54) SHARED STORAGE SYSTEMS AND METHODS FOR COLLABORATIVE WORKFLOWS

(71) Applicant: New Concepts Development Corp., Woodstock, IL (US)

(72) Inventors: Samuel A. Mestman, Los Angeles, CA (US); Eric Altman, Los Angeles, CA (US); Gergana Angelova, Los Angeles, CA (US); Joshua Minney, Los Angeles, CA (US); Kevin Bailey, Cupertino, CA (US); Dashel Scarborough, Calabasas, CA (US); Jacob Schwartz, Los Angeles, CA (US)

(73) Assignee: NEW CONCEPTS DEVELOPMENT CORP., Woodstock, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,186

(22) Filed: Mar. 17, 2022

(65) Prior Publication Data

US 2022/0345369 A1 Oct. 27, 2022

Related U.S. Application Data

(63) Continuation of application No. 16/553,604, filed on Aug. 28, 2019, now Pat. No. 11,283,685, which is a
(Continued)

(51) Int. Cl.
*H04L 41/0896* (2022.01)
*H04L 67/1097* (2022.01)
(Continued)

(52) U.S. Cl.
CPC .......... *H04L 41/0896* (2013.01); *G06F 16/22* (2019.01); *H04L 67/01* (2022.05);
(Continued)

(58) Field of Classification Search
CPC ............. H04L 41/0896; H04L 41/1097; H04L 41/141
See application file for complete search history.

(56) References Cited

U.S. PATENT DOCUMENTS 8,407,768 B1 * 3/2013 Hayter ................ H04L 63/0853
726/5
8,849,990 B2 * 9/2014 Mavromatis ............ H04L 65/60
709/224
(Continued)

*Primary Examiner* — Douglas B Blair
(74) *Attorney, Agent, or Firm* — Lewis Brisbois Bisgaard & Smith LLP

(57) ABSTRACT

A shared storage system that is optimized for post-production workflows that use NLEs such as Final Cut Pro X, DaVinci Resolve, Premiere and Avid is disclosed. Further, shared storage systems comprising workstations and shared storage systems, such as NAS devices, are disclosed that optimize workstation settings based on a database of optimal configuration settings to provide optimal bandwidth, minimal latency and stable performance for digital content creation/editing workflows that use file exchange between the workstation and the shared storage system. Novel methods and systems for storage systems are disclosed that configure and expose share drives in novel ways to facilitate video editing, audio editing and compositing.

1 Claim, 10 Drawing Sheets

Related U.S. Application Data continuation-in-part of application No. 16/351,857, filed on Mar. 13, 2019, now abandoned, which is a continuation of application No. 16/123,686, filed on Sep. 6, 2018, now abandoned.

(60) Provisional application No. 62/556,690, filed on Sep. 11, 2017.

(51) Int. Cl.

| | | |
|---|---|---|
| *H04L 67/06* | (2022.01) | |
| *G06F 16/22* | (2019.01) | |
| *H04L 67/141* | (2022.01) | |
| *H04L 67/01* | (2022.01) | |
| *H04L 67/568* | (2022.01) | |

(52) U.S. Cl.
CPC .......... *H04L 67/06* (2013.01); *H04L 67/1097* (2013.01); *H04L 67/141* (2013.01); *H04L 67/568* (2022.05)

(56) References Cited

U.S. PATENT DOCUMENTS

| | | | |
|---|---|---|---|
| 9,552,843 B2* | 1/2017 | Liebman | G11B 27/329 |
| 9,583,140 B1* | 2/2017 | Rady | H04N 21/44004 |
| 10,498,625 B1* | 12/2019 | Mozealous | H04L 41/082 |
| 11,283,685 B1* | 3/2022 | Mestman | H04L 67/01 |
| 2002/0113803 A1* | 8/2002 | Samra | H04M 3/567 |
| | | | 345/619 |
| 2002/0138443 A1* | 9/2002 | Schran | G06Q 20/382 |
| | | | 705/64 |
| 2003/0051014 A1* | 3/2003 | Gluska | H04L 61/50 |
| | | | 709/245 |
| 2005/0030309 A1* | 2/2005 | Gettman | G06F 16/954 |
| | | | 345/419 |
| 2005/0086612 A1* | 4/2005 | Gettman | G06F 16/954 |
| | | | 715/713 |
| 2007/0061429 A1* | 3/2007 | Lin | G06F 9/5083 |
| | | | 709/220 |
| 2009/0144347 A1* | 6/2009 | Boyd | G06F 16/122 |
| 2010/0174783 A1* | 7/2010 | Zarom | H04L 65/403 |
| | | | 709/205 |
| 2013/0080619 A1* | 3/2013 | Assuncao | G06F 9/5077 |
| | | | 709/224 |
| 2013/0080641 A1* | 3/2013 | Lui | H04L 43/065 |
| | | | 709/226 |
| 2013/0159500 A1* | 6/2013 | Reus | H04L 67/34 |
| | | | 709/224 |
| 2013/0275312 A1* | 10/2013 | Claman | G06Q 10/103 |
| | | | 705/301 |
| 2014/0344316 A1* | 11/2014 | Baranowsky | G06F 11/3433 |
| | | | 707/827 |
| 2015/0149906 A1* | 5/2015 | Toff | G11B 27/031 |
| | | | 715/723 |
| 2017/0078896 A1* | 3/2017 | Kephart, Jr. | H04L 41/0823 |
| 2018/0285288 A1* | 10/2018 | Bernat | C07F 15/0033 |
| 2020/0119988 A1* | 4/2020 | Castellanos | G06F 9/44505 |

* cited by examiner

SHARED STORAGE SYSTEMS AND METHODS FOR COLLABORATIVE WORKFLOWS

RELATED APPLICATIONS

The present application is a continuation of U.S. application Ser. No. 16/553,604, filed Aug. 28, 2019, which is a continuation-in-part of U.S. application Ser. No. 16/351,857, filed Mar. 13, 2019, which is a continuation of U.S. application Ser. No. 16/123,686, filed Sep. 6, 2018, which claims priority under 35 U.S.C. § 119 to U.S. Provisional Application No. 62/556,690, filed Sep. 11, 2017, the disclosures of which are expressly incorporated herein.

FIELD OF THE INVENTION

The present invention relates to shared storage systems, such as network attached storage devices, and particularly to shared storage systems for digital content creation in a shared workflow environment.

BACKGROUND OF THE INVENTION

Network-attached storage (NAS) refers to the provision of file level computer data storage over a computer network, hereinafter network can be wired or wireless, that offers data access to heterogeneous network clients. A network attached storage (NAS) device typically utilizes a specialized file server or network attached storage system that connects to the network. A NAS unit is essentially a self-contained computer connected to a network that supplies file-based data storage services to other devices on the network. A NAS device often contains a reduced capacity or minimized operating and file management system (e.g., a microkernel) and normally processes input/output (I/O) requests by supporting common file sharing protocols such as the UNIX network file system (NFS), DOS/Windows, and server message block/common Internet file system (SMB/CIFS). Using traditional local area network protocols such as Ethernet and transmission control protocol/internet protocol (TCP/IP), a NAS device typically enables additional storage to be quickly added to a network.

Specifically, a NAS system may be a high-performance file sharing and storage device, and users using NAS can share files via an IP network. In particular, NAS devices can be a powerful component of collaborative digital content creation workflows such as post-production workflows. Multimedia content (e.g., films and television programs) needs to be processed before it is released for the enjoyment of the user. This process known as post production or post processing may comprise many steps to take the multimedia content from the actual recording to the release: editing, de-rushing, mixing, addition of digital effects, dubbing, subtitling, sound editing, etc. These steps may be accomplished by multiple users, working in disparate geographies, using a variety of processing devices (e.g., computer workstations) and specialized post production software.

The state-of-the-art software is what is known as non-linear editing (NLE) software such as Final Cut Pro (FCP) or Premiere or Resolve or Avid. Such software has several dedicated editing suites for advanced editing, color correction, graphics, finishing and QC. A shared storage system is specially needed for facilities that collaboratively edit using NLEs because of how the NLE needs to be integrated in a collaborative environment to be able to work effectively. Specifically, in a collaborative workflow, NLEs require that several small files, e.g., libraries, projects, databases, are stored on a shared storage server so that all the users collaborating on the project can share these files. In a traditional SAN environment (especially XSAN environments), NLE, e.g., libraries have a difficult time because SAN's by nature don't handle small database-driven files well, which is exactly what some NLEs require in order to work quickly and effectively. This causes NLE cache, waveform, and analysis files to perform poorly in a SAN environment.

Thus, there is a need for a shared storage solution that is optimized for post-production workflows that use NLEs such as Final Cut Pro X (FCP X). Further, the existing shared storage devices, such as NAS devices, are difficult to configure and no system exists that can provide optimal bandwidth, minimal latency and stable performance when a digital content creation/editing workflow is created using a NAS device. The system disclosed herein provides an improved shared storage device, such as a NAS device, that addresses these needs and other problems.

SUMMARY OF THE INVENTION

In a first embodiment, the present application provides a method for configuring a client workstation with one or more settings for optimum bandwidth, latency and stability for file exchange with a shared storage server that comprises connecting the client workstation to the shared storage server, determining one or more attributes of the client workstation, using the one or more attributes of the client workstation to consult a database comprising optimum configuration settings for the client workstation to determine the one or more settings for optimum bandwidth, latency and stability for file exchange with the shared storage server, and modifying the client workstation settings to be one or more settings for optimum bandwidth, latency and stability for file exchange with the shared storage server. The one or more attributes of the client workstation can be selected from the group comprising characteristics of the central processing unit of the client workstation, the characteristics of the memory of the client workstation, the characteristics of the operating systems of the client workstation, the speed and characteristics of the connection between the client workstation and the shared storage server. In one embodiment, the shared storage server is a network attached storage device. In one embodiment, the step of determining one or more client attributes comprises running a system profiler for the client workstation. In one embodiment, the client workstation is directly connected to the shared storage servers. In one embodiment, the client workstation is connected to the shared storage server through a Thunderbolt adapter.

In a second embodiment the present application provides a network system that is configured with one or more settings for optimum bandwidth, latency and stability for file exchange that comprises a client workstation, a shared storage server, a connection that connects the client workstation to the shared storage server, and an application residing on the client workstation that during runtime determines one or more attributes of the client workstation, using the one or more attributes of the client workstation consults a database comprising optimum configuration settings for the client workstation to determine the one or more settings for optimum bandwidth, latency and stability for file exchange with the shared storage server, and modifies the client workstation settings to be one or more settings for optimum bandwidth, latency and stability for file exchange with the shared storage server. In one embodiment, the shared storage server is a network attached storage device.

In a third embodiment the present application provides a network system for collaborative digital content creation workflow that comprises at least one client workstation that can run an application for digital content creation, a network attached storage device comprising a fast memory storage pool that can be shared with the client workstation, and a connection connecting the client workstation to the network attached storage device, wherein during runtime the application for digital content creation can be set to use the fast storage pool for performing one or more application functions. In one embodiment, the application function is caching. In another embodiment, the application function is storing a library. In another embodiment, the application function is storing a project. In one embodiment, the application is Final Cut Pro.

In a fourth embodiment, the present application provides a network system for file exchange, the network system that comprises a first client workstation, a shared storage server with more than one Ethernet ports, wherein the Ethernet ports are numbered according to a numbering system, a connection that connects the first client workstation to a first Ethernet port on the shared storage server, and an application residing on the client workstation that during runtime determines the number of the Ethernet port that the first client workstation is connected to and sets the IP address of the Ethernet port to its number according to the numbering system. In one embodiment the network systems further comprises a second client workstation, and a connection that connects the second client workstation to a second Ethernet port on the shared storage server, an application residing on the second client workstation that during runtime determines the number of the Ethernet port that the second client workstation is connected to and sets the IP address of the Ethernet port to its number according to the numbering system.

In a fifth embodiment, the present application provides a network system for file exchange that comprises a client workstation, a shared storage server comprising a first storage volume and a second faster storage volume, wherein one or more data files reside on the first storage volume, a connection that connects the client workstation to the shared storage server, and an application residing on the shared storage server that during runtime determines the type of data file being accessed by the client workstation and depending on the determined type of file, makes a decision about moving the data file to the second faster storage volume. In one embodiment, the shared storage server is a network attached storage device. In one embodiment, the first storage volume comprises hard disk drives. In one embodiment, the second storage volume comprises solid state drives.

In a sixth embodiment, the present application provides a network system for collaborative digital content creation workflow that comprises at least one client workstation that can run an application for digital content creation that requires access to an application database, a network attached storage device comprising a storage pool that can be shared with the client workstation, wherein the storage pool has stored on it the application database and a connection connecting the client workstation to the network attached storage device, wherein during runtime the application for digital content creation can be set to use the application database that is stored on the storage pool of the network storage device. In one embodiment, the application is Da Vinci Resolve.

BRIEF DESCRIPTION OF THE DRAWINGS

Features and advantages of the present invention will become appreciated as the same become better understood with reference to the specification, claims, and appended drawings wherein:

DETAILED DESCRIPTION OF THE PREFERRED EMBODIMENTS

Figure 1:
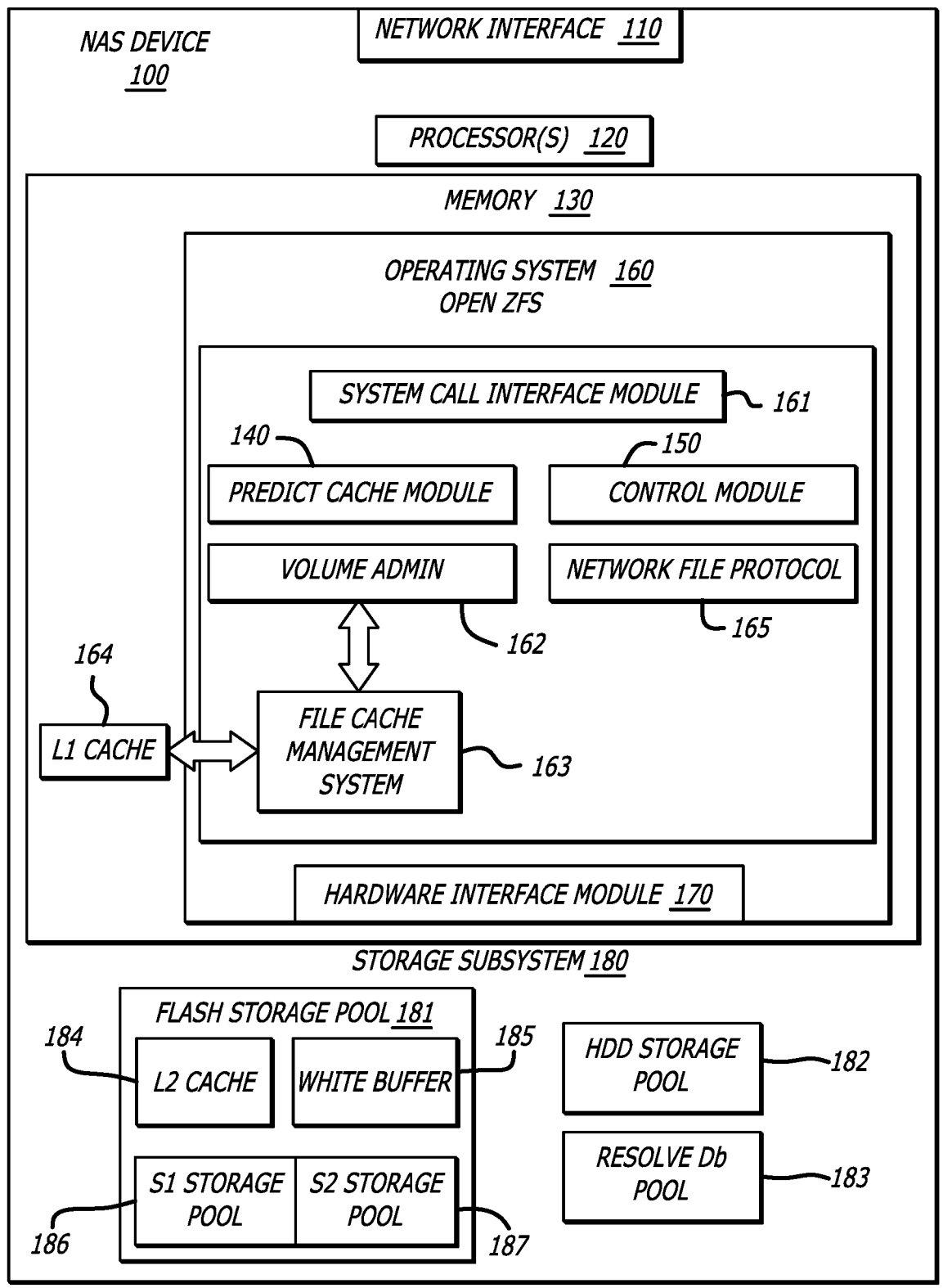
FIG. 1 is a block diagram illustrating an exemplary network attached storage device according to one embodiment of the present application.

In the following description of exemplary embodiments, reference is made to the accompanying figures in which it is shown by way of illustration certain specific embodiments in which the present application can be practiced. It is to be understood that other embodiments can be used and structural changes can be made without departing from the scope of the present invention.

As used herein, the terms "application," "computer program" and "software" include without limitation any sequence of human or machine recognizable steps that are adapted to be processed by a computer. Such may be rendered in any programming language or environment including, without limitation, C/C++, Fortran, COBOL, PASCAL, Perl, Prolog, Python, MATLAB, assembly language, scripting languages, markup languages (e.g., HTML, SGML, XML, VoXML), functional languages (e.g., APL, Erlang, Haskell, Lisp, ML, F # and Scheme), as well as object-oriented environments such as the Common Object Request Broker Architecture (CORBA), Java® (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices also include fewer dynamic devices such as printers, e-ink devices, and other similar structures.

As used herein, the terms "local" and "remote" refer generally to devices, entities, or users that are serviced by separate sets of processes. These terms are intended to be relative, and bear no absolute reference or connotation to the physical location of the executed processes of the served device, entities, or users.

As used herein, the term "module" refers to any type of software, firmware, hardware, or combination thereof that that implements a specific functionality or theme.

As used herein, the term "network" refers generally to any type of telecommunications or data network including, without limitation, cable networks, satellite networks, optical networks, cellular networks, and bus networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, hybrid fiber coaxial, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, Wi-Fi (802.11a,b,g,n), WiMAX (802.16), PAN (802.15), or IrDA families.

As used herein, the terms "processor," "microprocessor," and "digital processor" include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die or distributed across multiple components.

As used herein, the term "storage pool" refers to storage media for storing digital data including, without limitation, solid state drives (SSD) including non-volatile memory express SSDs (NVMe/SSDs), magnetic storage media including, without limitation, hard disk drives, optical drives, or tape drives.

As used herein, the term "storage server," "shared storage server," "shared storage," "server," and "network attached storage" are used interchangeably and refer to any computerized component, system or entity, regardless of form, which is adapted to provide data, files, applications, content, or other services to one or more other devices or entities on a computer network.

As used herein, the term "wireless" refers to any wireless signal, data, communication, or other interface including, without limitation, Wi-Fi, Bluetooth, 3G, HSDP/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Figure 6:
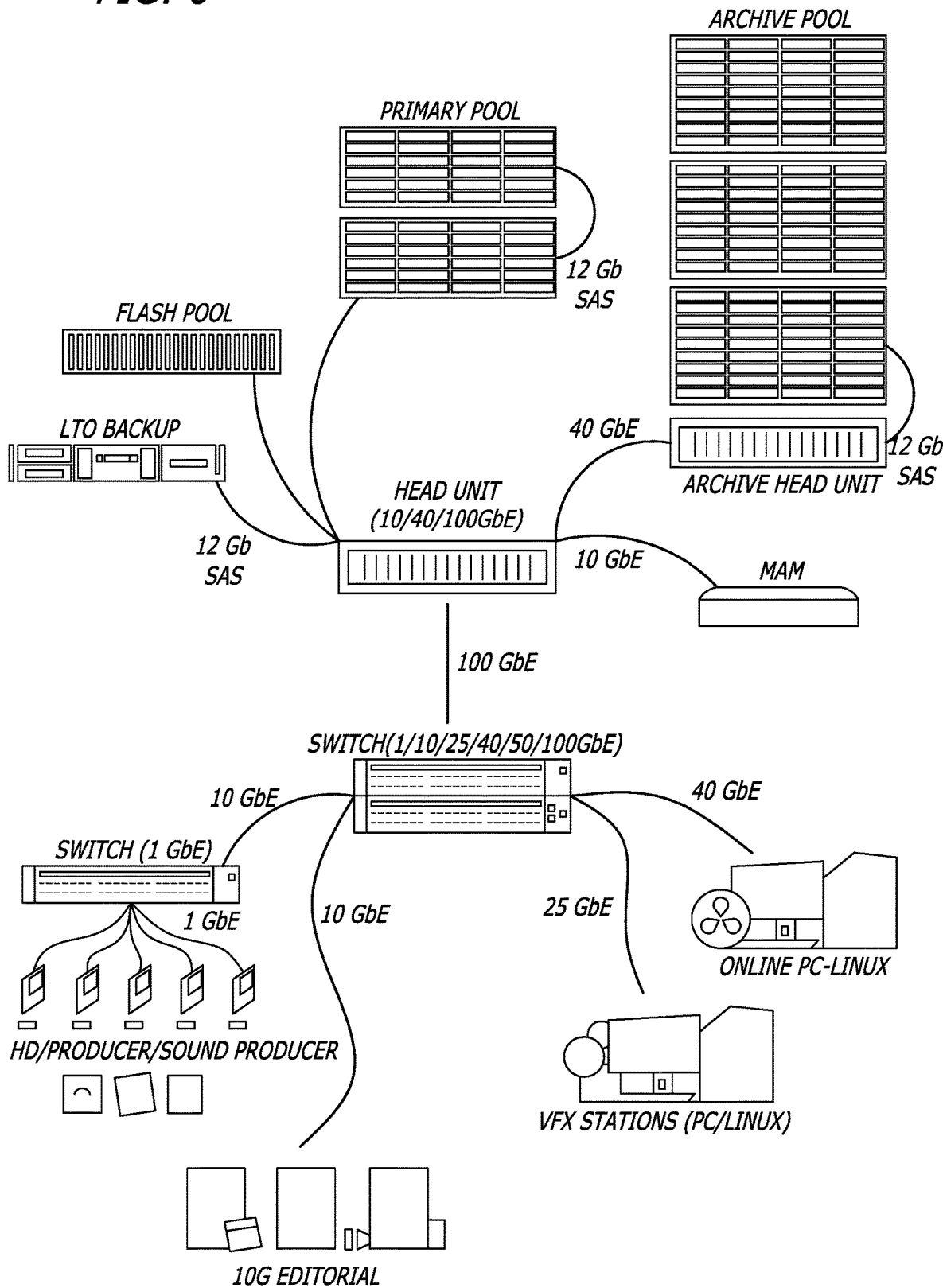
FIG. 6 is an exemplary post-production workflow implemented using an embodiment of the shared storage servers of the present application.

FIG. 1 is a schematic illustration of one embodiment of a network attached storage (NAS) device 100, which may be used to implement one or more of the network attached storage devices depicted in FIG. 6. Referring to FIG. 1, NAS device 100 comprises one or more network interfaces 110 which enables a communication connection directly with a client workstation or through a network (e.g., one or more devices connected to the NAS via a switch).

Network interface 110 may comprise one or more input/output (I/O) ports to provide a physical connection with a client workstation or a network. For example, network interface 110 may comprise one or more Ethernet ports. The back end of an exemplary embodiment of the system shown in FIG. 3A, comprises eight Ethernet ports. Network interface 110 may comprise a network interface card (NIC), also commonly referred to as a network adapter or a network card. The NIC manages I/O operations to enable NAS device 100 to communicate with a client workstation or a network connected to the NAS. Alternatively, the operations of the NIC may be implemented on a main circuit board such as, e.g., a motherboard of NAS device 100.

NAS device 100 further comprises at least one processor 120. As used herein, the term "processor" means any type of computational element, such as, but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

NAS device 100 further comprises system random access memory (RAM) 130 of 1 gigabyte or more. In certain embodiments the RAM may be 64 gigabytes. In certain embodiments, the RAM may be 800 gigabytes. It may additionally or alternatively comprise read-only memory (ROM). Memory 130 comprises an operating system 160 for managing operations of NAS device 100. In one embodiment, operating system 160 comprises a hardware interface module 170 that provides an interface to system hardware. The particular embodiment of operating system 160 is not critical to the subject matter described herein. The server, e.g., NAS device 100, with its storage subsystem 180 (discussed below) and connections to a client workstation or a network, preferably, runs the Linux operating system 160 (or, equivalently running a Unix or like Unix variant operating system, including Apple's OS X, or a Windows brand operating system, which can run the software and hardware as described herein below).

ZFS architecture: An exemplary operating system 160 of the present application uses ZFS architecture ("ZFS") to administer data storage on the storage media, which is a robust, versatile file system and logical volume manager that administers file systems. ZFS uses a 128-bit addressing scheme and can store up to 275 billion TB per storage pool, and is a product of Oracle Corporation of Redwood Shores, Calif. A full explanation of the ZFS architecture is available in a white paper entitled Architectural Overview of the Oracle ZFS Storage Appliance—ORACLE WHITE PAPER|FEBRUARY 2018, the disclosure of which is expressly incorporated herein.

Use of ZFS allows pooled storage, where all available hard drives in the storage system are essentially joined together. The combined bandwidth of the pooled devices is available to ZFS. ZFS takes available storage drives and pools them together as a single resource, called a "zpool". This can be optimized for capacity, I/O performance or redundancy, using striping, mirroring or some form of redundant array of independent disks (RAID). In computer storage, the standard RAID levels comprise a basic set of RAID configurations that employ the techniques of striping, mirroring, or parity to create large reliable data stores from multiple general-purpose computer hard disk drives (HDDs). If more storage is needed, then more drives can simply be added to the zpool: ZFS sees the new capacity and starts using it automatically, balancing I/O and maximizing throughput. Instead of pre-allocating metadata like other file systems administrators, ZFS utilizes dynamically allocated metadata as needed, with no initial space required at the initialization and no limit on the files or directories supported by the file system. There is no need to predetermine the size of a file system, as file systems grow automatically within the disk space allocated to the storage pool. When new storage is added, all file systems within the pool can immediately use the additional disk space without additional work.

ZFS ensures that data is always consistent on the disk using a number of techniques, including copy-on-write. Thus, when data is changed it is not overwritten—it is always written to a new block and check summed before pointers to the data are changed. The old data may be retained, creating snapshots of the data through time as changes are made. File writes using ZFS are transactional—either everything or nothing is written to disk. ZFS can be scheduled to perform a "scrub" on all the data in a storage pool, checking each piece of data with its corresponding checksum to verify its integrity, detect any silent data corruption and to correct any errors where possible.

When the data is stored in a redundant fashion—in a mirrored or RAID-type array—it can be self-healed automatically and without any administrator intervention. Since data corruption is logged, ZFS can bring to light defects in memory modules (or other hardware) that cause data to be stored on hard drives incorrectly. Scrubbing is given low I/O priority so that it has a minimal effect on system performance and can operate while the storage pool is in use. An advantage of copy-on-write is that, when ZFS writes new data, the blocks containing the old data can be retained, allowing a snapshot version of the file system to be maintained. ZFS snapshots are created very quickly, since all the data composing the snapshot is already stored. They are also space efficient, since any unchanged data is shared among the file system and its snapshots. Initially, snapshots consume no additional disk space within the pool. As data within the active dataset changes, the snapshot consumes disk space by continuing to reference the old data. As a result, the snapshot prevents the data from being freed back to the pool. ZFS also allows writeable snapshots ("clones") to be created, resulting in two independent file systems that share a set of blocks. As changes are made to any of the clone file systems, new data blocks are created to reflect those changes, but any unchanged blocks continue to be shared, no matter how many clones exist. This is possible due to the copy-on-write design. Snapshots of ZFS file systems and volumes can be sent to remote hosts over the network. This data stream can be an entire file system or volume, or it can be the changes since it was last sent. When sending only the changes, the stream size depends on the number of blocks changed between the snapshots. This provides a very efficient strategy for synchronizing backups.

ZFS Caching: ZFS architecture includes "adaptive replacement cache" or ARC that is a very fast block level cache located in the system's memory. In the embodiment shown in FIG. 1, this is the L1 Cache 164. Any read requests for data in the cache can be served directly from the ARC memory cache instead of the much slower hard drives that improves performance for data that is accessed frequently. In some embodiments of the system the RAM is 64 gigabytes or more, and even 800 gigabytes or more allowing the ARC, L1 Cache, to be set at a very high value. ZFS architecture also includes L2ARC, the second level adaptive replacement cache, shown as L2 Cache 184 in FIG. 1. The L2 Cache is a part of the Flash Storage Pool 181, which, for example, is comprised of NVMe/SSDs and is described below. The L2ARC is often called the "cache drive" in ZFS systems. The algorithms that manage L2ARC population are automatic and intelligent. In accordance with the present application, with the L2 Cache present in the ZFS pool, the L2 Cache will cache frequently accessed data that did not fit in ARC. When read requests come into the system, ZFS will attempt to serve those requests from the L1 Cache. If the data is not in the L1 Cache, ZFS will attempt to serve the requests from the L2 Cache. Hard drives are only accessed when data does not exist in either the L1 Cache or L1 Cache. This means the hard drives receive far fewer requests that can have a dramatic improvement on performance.

The present application also provides a Write Buffer 185 in the Flash Storage Media 181 to serve as the "ZFS intent log" ("ZIL") that acts as a logging mechanism to store synchronous writes, until they are safely written to the main data structure on the storage pool. The speed at which data can be written to the ZIL determines the speed at which synchronous write requests can be done. By using NVMe/SSDs as the ZIL, the exemplary system accelerates the ZIL and improves synchronous write performance. Like L2 Cache 184, the Write Buffer 185 is managed automatically and intelligently by ZFS. Thus, by using the NVMe/SSDs for both the L2ARC and the ZIL in accordance with one embodiment of the exemplary system, both read and write data is accelerated.

Further, the NAS Device 100 includes a Network File Protocol module 165, which is a service that runs on the NAS device for enabling file exchange. In accordance with the present application, this protocol implements one or more of Network File System (NFS) protocols, an SMB/Common Internet File System (CIFS) protocol, an AFP protocol, an iSCSI protocol, or the like.

In one embodiment, the operating system 160 may comprise a file cache management system 163. File cache management system 163 interfaces with the operating system(s) 160 to manage the L1 Cache 164, L2 Cache 184 and Write Buffer 185 as resources for the NAS Device 100.

Operating system 160 further may comprise a system call interface module 161 that provides an interface between the operating system 160 and one or more application modules, e.g., predictive cache module, that execute on NAS device 100.

NAS device 100 further comprises storage subsystem 180 for storing digital media files and other data and preferably providing terabytes to petabytes of storage capacity, for example, a storage subsystem 180 comprising a HDD storage pool 182, which consists of hardware device interface cards which are attached both to 32-bit PCI or 64-bit PCI/PCI-X/PCI-Express slots on the motherboard and to high-capacity internal hard drives (e.g., 12 Gb SAS or Serial ATA drives), and/or a flash storage pool 181 consisting of SSD, preferably NVMe/SSDs, memory cards which are connected to the server motherboard. Thus, the storage subsystem 180 may comprise storage media including, but not limited to, hard disk drives, magnetic disks, tape drives, optical storage drives, and solid-state drives (SSD), for example, NVMe/SSDs and memory cards, etc. As would be known to skilled artisans, the hardware architecture may alternately comprise media access control devices configured to support IDE, SCSI, Fibre Channel, Firewire, and USB devices, protocols and topologies. Regardless of the storage media controller contemplated (e.g., SAS, SATA, IDE, or SCSI) it can control one or more storage media drives 181, 182 configured in and/or connected to the server. It should be understood that any combination of storage media drives is contemplated. For example, storage subsystem 180 may be embodied as one or more arrays of magnetic disk drives, for example, a hard disk drive (HDD) storage pool 182. Alternatively, or additionally storage subsystem 180 may comprise solid state drives (SSD), optical, magneto-optical, or electro-optical storage media. For example, storage subsystem 180 may comprise NVMe/SSDs flash storage pool 181. In various embodiments, storage subsystem 180 may comprise only flash storage pool or only a disk storage pool or it may be a hybrid of the two as shown in FIG. 1. Storage subsystem 180 may be configured to implement RAID redundancy.

As shown in FIG. 1, in one embodiment of the exemplary system the storage subsystem 180 comprises a flash storage pool 181 comprised of, e.g., NVMe/SSDs. The flash storage pool is further comprised of L2 Cache 184, Write Buffer 185, S1 Storage Pool 186 and S2 Storage Pool 187.

Figure 2:
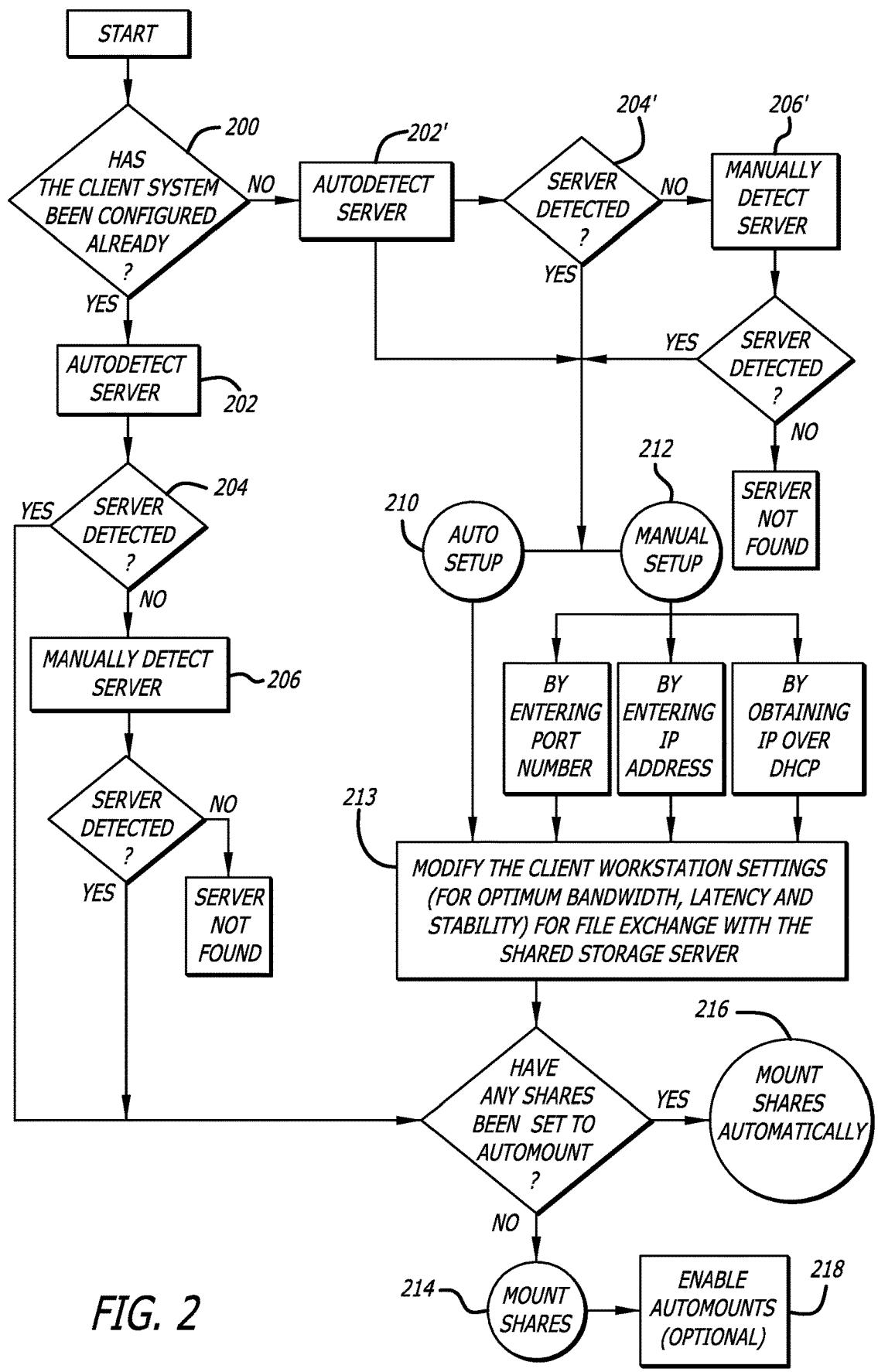
FIG. 2 is a block diagram illustrating an exemplary share application flow chart according to one embodiment of the present application.

Share Application: In one embodiment, the workstation that is connected to the shared storage server, for example, NAS device 100, has installed on it a computer program that is referred to as the "share application" of the exemplary system herein, the logic flow for an embodiment of which is illustrated in FIG. 2. The share application provides multiple functionalities: finding the shared storage server, e.g., the NAS 100 of the exemplary system, using a modified bonjour type of software module, mounting of the shared storage server of the system as one or more shared drives onto the client's computers and network, using attributes of the client's workstation for optimizing client file sharing settings to maximize available bandwidth, minimize latency and maximize stability, and for Apple Macintosh computers, file searching capability using Spotlight.

In an exemplary embodiment, the server broadcasts its existence using a modified bonjour protocol to all devices connected to the server. Bonjour is Apple's implementation of zero-configuration networking (zeroconf), a group of technologies that includes service discovery, address assignment, and hostname resolution. Bonjour locates devices such as printers, other computers, file-sharing servers and the services that those devices offer on a local network. While there is Bonjour for Windows, Microsoft does have its own implementation of zero-configuration networking referred to as Automatic Private IP Addressing (APIPA) or Internet Protocol Automatic Configuration (IPAC). More well known, Universal Plug and Play (UPnP) is a set of networking protocols that permits networked devices, such as personal computers, printers, Internet gateways, Wi-Fi access points and mobile devices to seamlessly discover each other's presence on the network and establish functional network services for data sharing, communications, and entertainment. These will all be referred to as bonjour type of software modules, and the present application implements a modified bonjour protocol.

In operation, a client workstation is connected to a shared storage server of the exemplary system, e.g., the NAS device 100, over a directly connected wire or over a network (e.g., via a switch). For instance, a client workstation may be remote and be able to access the NAS device 100 via the share application which is web-based. The client workstation implements the share application according to the logic flow illustrated in FIG. 2.

Create Shares: Prior to any downstream users being given access, the shares themselves must be created on the server. A "share" is a term for a folder on the server than can be shared by multiple clients, meaning that various clients may read and write to files and execute programs that reside in the shared folder. Such files/programs may be related to a unique project such as a film or a scene in a film, or the shared folder may contain all media and files/programs owned by a single company or division therein. The example of film content is used, though the same technique for sharing media and files may be useful for a variety of end products, such as other entertainment projects, advertising, multimedia presentations, musical scores, graphic novels, etc. When an administrator creates a share, the share must be instructed to provide various permissions for various end-users, as will be described below.

FIG. 2A is a flow diagram of the process for creating shares. The NAS of the exemplary system supports both NFS and SMB network protocols for file sharing, and so at steps 300 and 302 the process starts with a command to create a share with one or the other. At step 304, the user gets to name their share in a way it will show up in their share application and as a shared device on their client computers. Next, the share application creates a new dataset using the entered name at step 310, sets default permissions at 312 and default settings optimized for the task in step 314 (in this case for video post-production). The share application then creates a new mountpoint in step 320 and a discrete share under the assigned name in step 322. The share is linked to a mountpoint in step 324 and then default optimizations of the NAS device 100 are set for SMB and NFS shares, depending on the protocol, in step 326.

System Operation: When an administrator or end-user first connects to the NAS device 100, the share application determines at 200 if the client workstation has previously been configured by the share application. If it has been configured (YES at 200), the application runs a process at 202 to autodetect the NAS device (server). If the NAS device is detected (YES at 204), the client workstation can mount the NAS device's available shares to share files between the workstation and the NAS device, described below. If the share application cannot autodetect the NAS device (NO at 204), or if the user so chooses, it will run a process at 206 to manually detect the NAS device. This process may require user input in response to queries such as "Is this NAS device directly attached" or "is the NAS device on a switch." It will guide the client workstation user through queries until it detects that there is a NAS device connected or it can confidently say that there is no NAS device connected.

If the share application determines that the client workstation has not been configured by the application, (NO at 200), the application again runs a process at 202' to autodetect the NAS device (server). If the NAS device is detected (YES at 204'), the application will run a configuration process to configure the workstation by going into auto configuration mode, or a manual setup may be chosen, described below. If the share application cannot autodetect the NAS device (NO at 204'), it will again run a process at 206' to manually detect the NAS device until it detects that there is a NAS device connected or it can confidently say that there is no NAS device connected.

If the share application determines that the client workstation has not been configured by the application (NO at 200) and the server is detected (either automatically or manually), the share application will run a configuration process. An automatic setup at 210 or a manual setup at 212 will put all the workstation configuration settings in place: the client workstation IP addresses will be modified in accordance with an embodiment of the present application described with reference to FIGS. 3A-3G below, change the workstation host file, and optimize the workstation NFS and/or SMB settings for optimal file sharing between the workstation and the NAS device at 213 in accordance with an optimization module of the exemplary system, as described below with respect to FIG. 4. It can also optimize NIC driver settings.

The automatic setup at 210 triggers the client computer to scan for a netmask and a netbios name that are indicative for the presence of a NAS device (server). The share application recognizes the network interface used on the client computer to connect to the NAS device, and modifies the IP address and subnet mask of that interface, as well as certain advanced settings such as the network speed that is negotiated by the client and server devices and the MTU/Jumbo Frames. In the process of Auto Setup 210, the share application also modifies the host's file on the client computer. That way the IP address of the client computer is given a range of names that are used later in interacting with the NAS device(s), which is done for ease of use of the customer.

Figure 3:
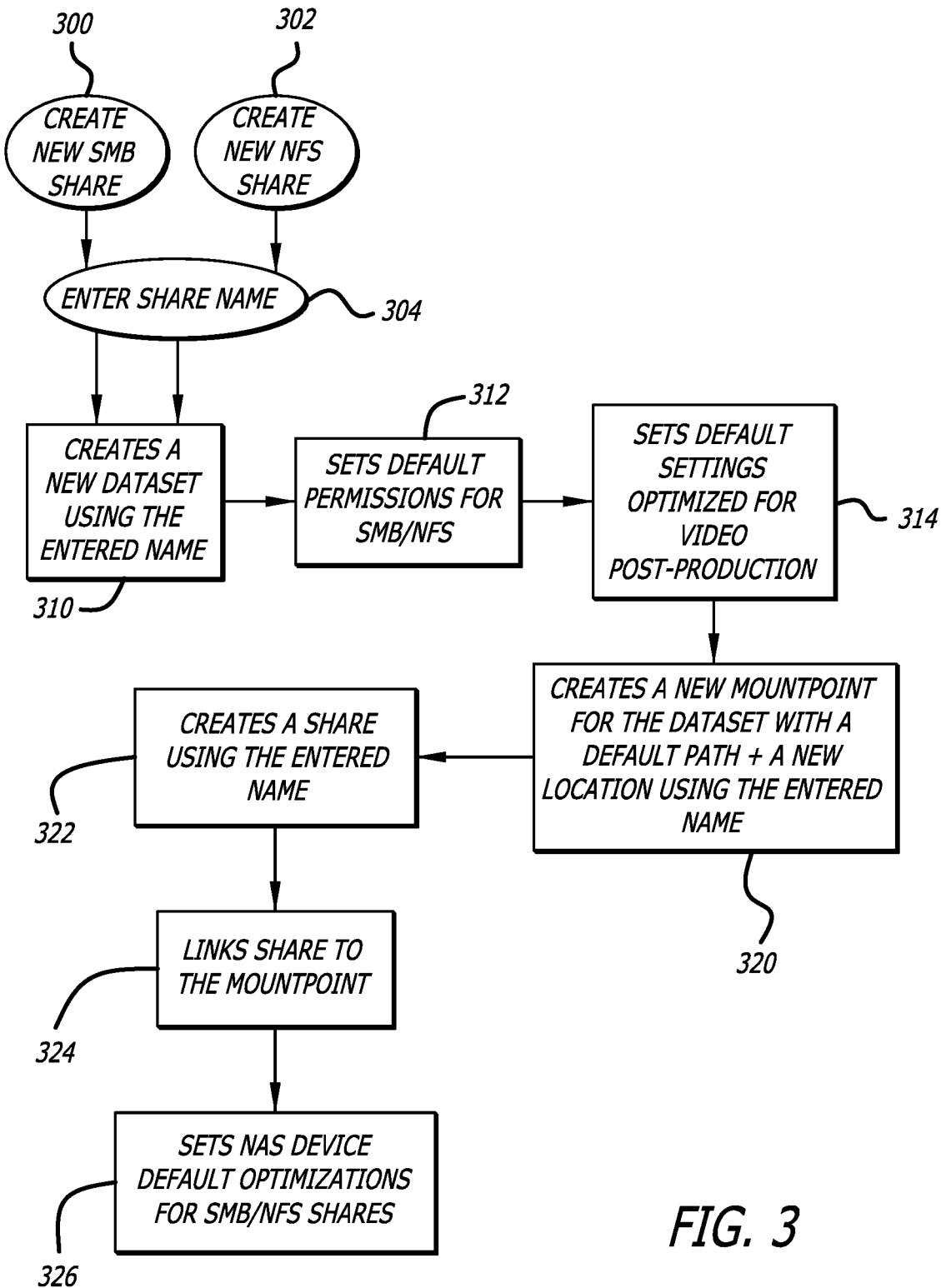
FIG. 3 is a flow diagram of a process for creating shares.
Figure 3A:
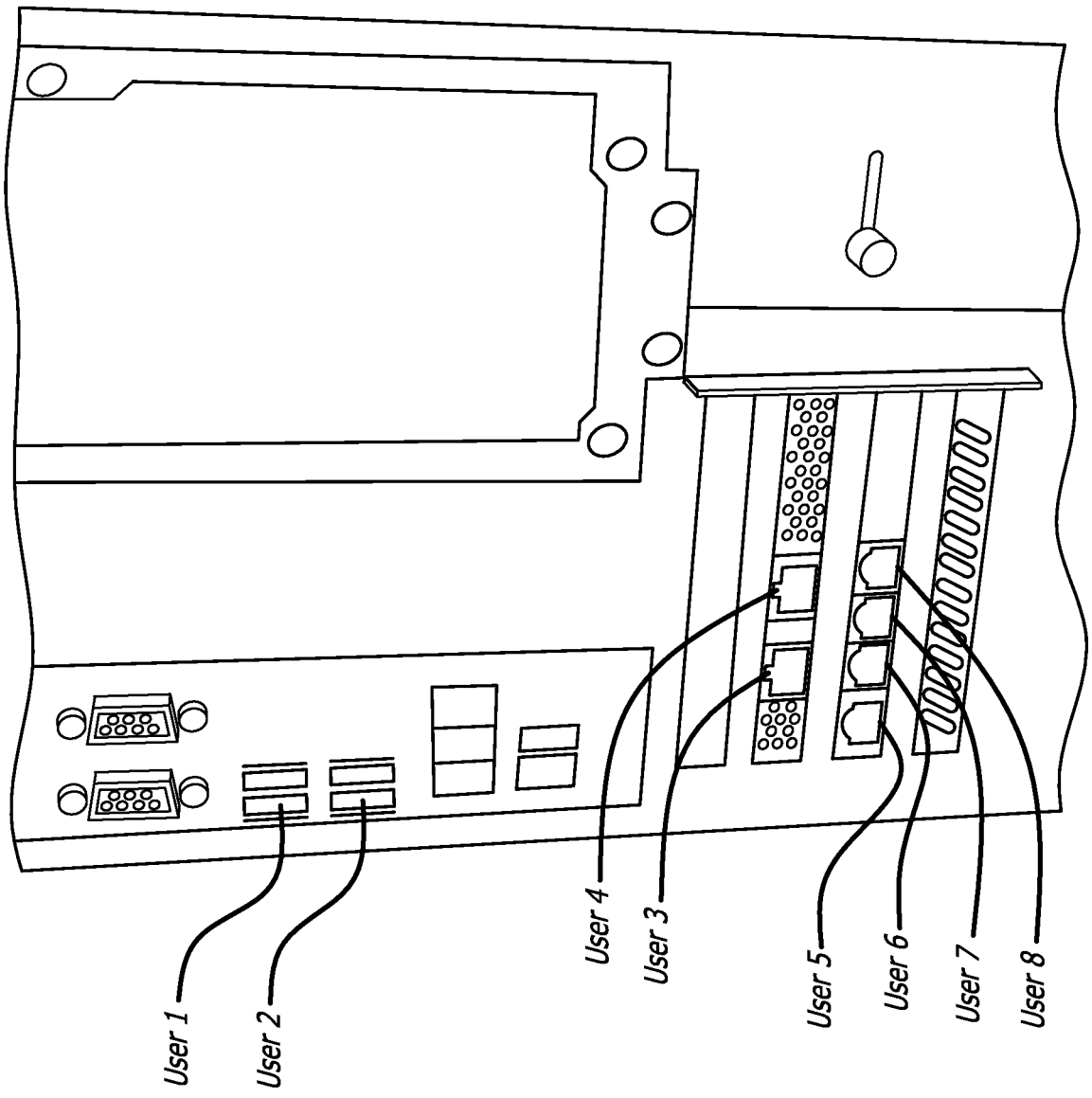
FIG. 3A is the back end of an exemplary network attached storage device according to one embodiment of the present application that illustrates how Ethernet ports on the device are assigned user numbers.

Share Application IP Address Translation: The share application of the exemplary system predefines IP addresses based on the user number of a client workstation connected to the shared storage server of the system, e.g., NAS device 100. The user number is determined simply by the Ethernet port to which the client workstation is connected. FIG. 3A shows the back end of a shared storage server of the exemplary system, e.g., NAS device 100. In an exemplary embodiment according to FIG. 3A, user numbers are assigned top to down and left to right in the order of the Ethernet ports where the workstations are connected to the NAS device. Thus, the topmost connection is "User 1", the one below it is "User 2", the one below it is "User 3", the one to the right of that is "User 4", the one below the "User 3" port is "User 5" and the ones to the right of that are "User 6", "User 7" and "User 8", going left to right, sequentially. So, the end user does not need to know the IP address to connect to the NAS. The pseudo IP address is simply the number of the port to which the client computer is connected. Then the application translates the IP addresses of the eight Ethernet ports of the above example to be simply 1, 2, 3, 4, 5, 6, 7, and 8. These predefined IP addresses are used throughout the share application instead of actual IP addresses.

Figure 3B:
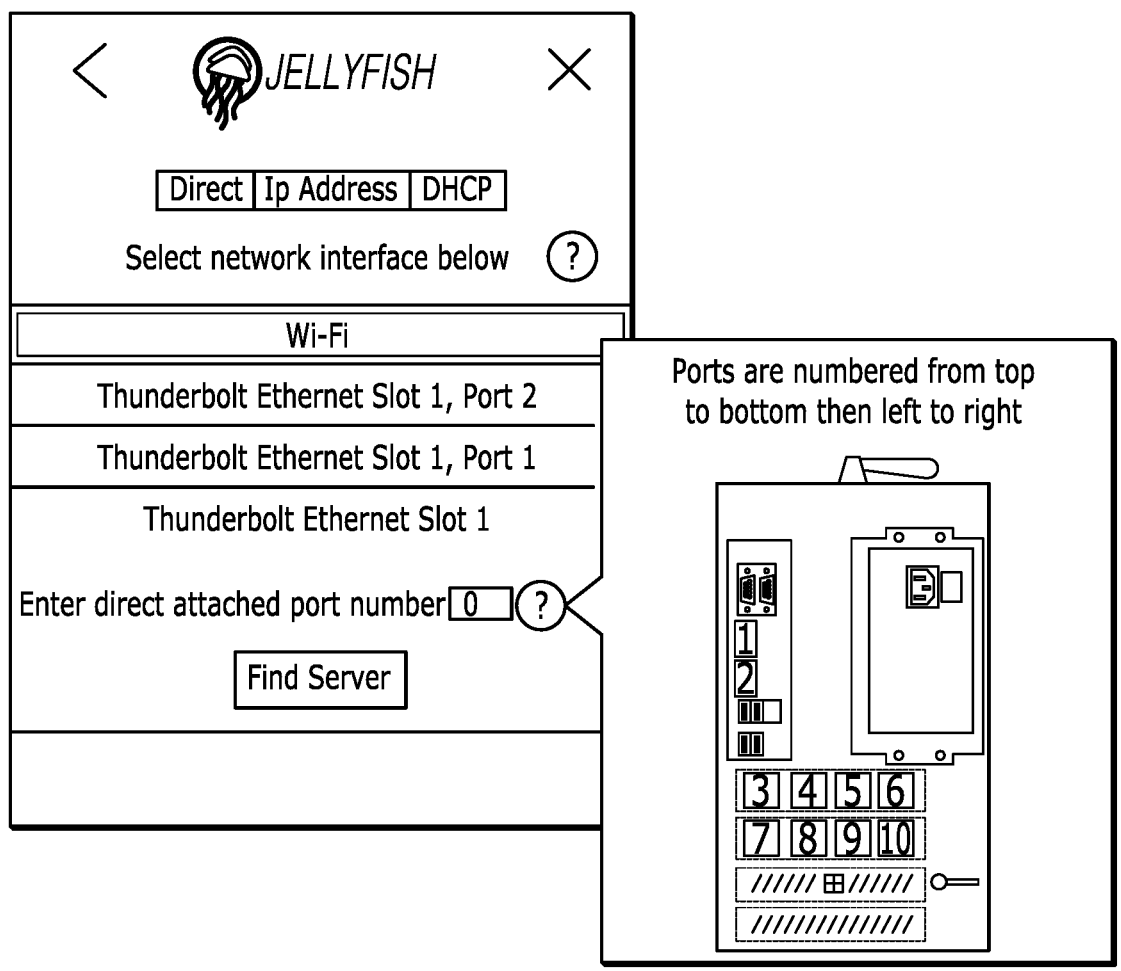
FIG. 3B-3G are various query forms of one embodiment of the share application of the exemplary system.

Thus, as shown in FIG. 3B, instead of providing actual IP addresses (as in prior art), the user of a client workstation connected to the NAS device needs to provide the share application only the Ethernet port on the NAS device to which the workstation is connected. FIG. 3B also shows in a pop-up graphic the numbering scheme for ports to which users are connected, again sequentially from top to bottom and left to right. It will be understood by one of skill in the art, that any other numbering scheme for ports may be used. For example, increasing sequence from bottom to top and right to left and other variations. The key point is that the connection ports to which user workstations are connected have unique numbers and then for purposes of the share application the IP address of the port to which a user is connected is simply the port number to which the user is connected.

Figure 3C:
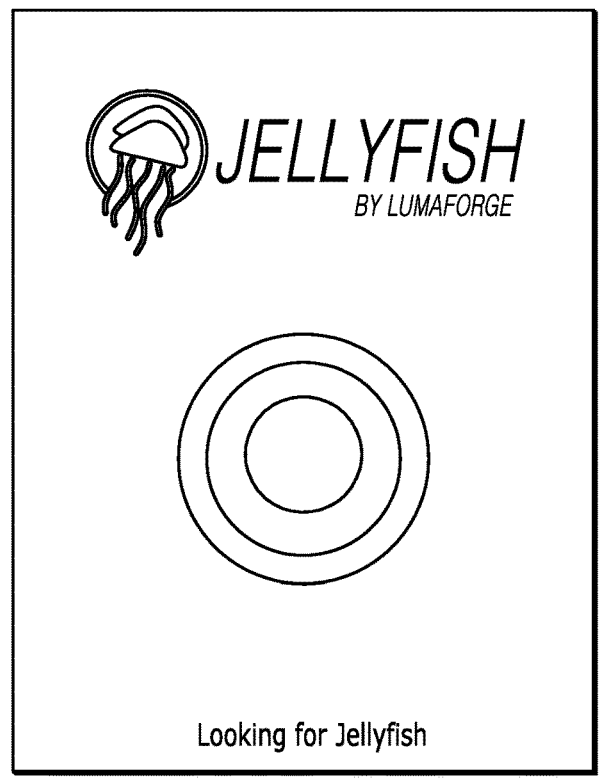
Figure 3D:
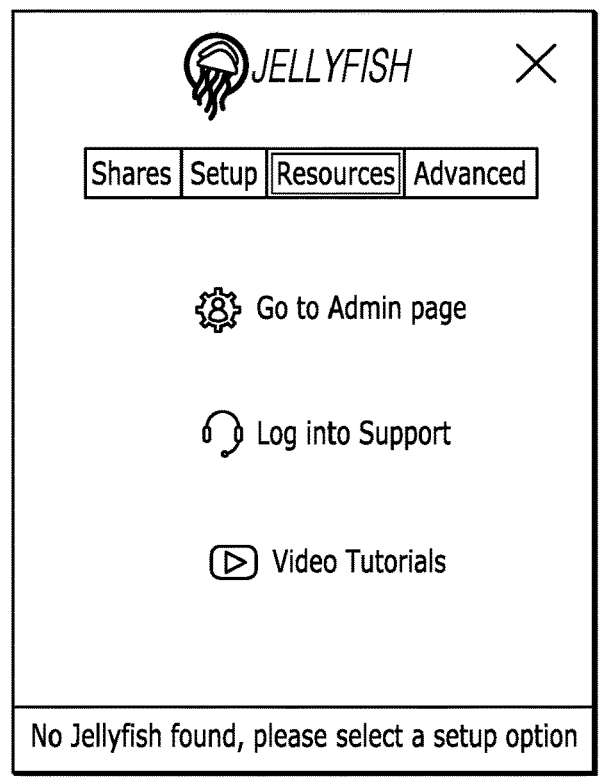
Figure 3E:
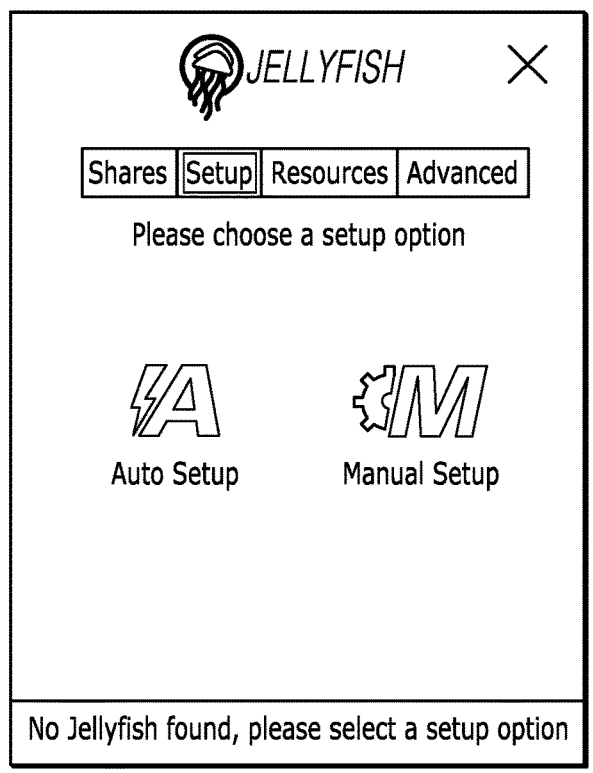
Figure 3F:
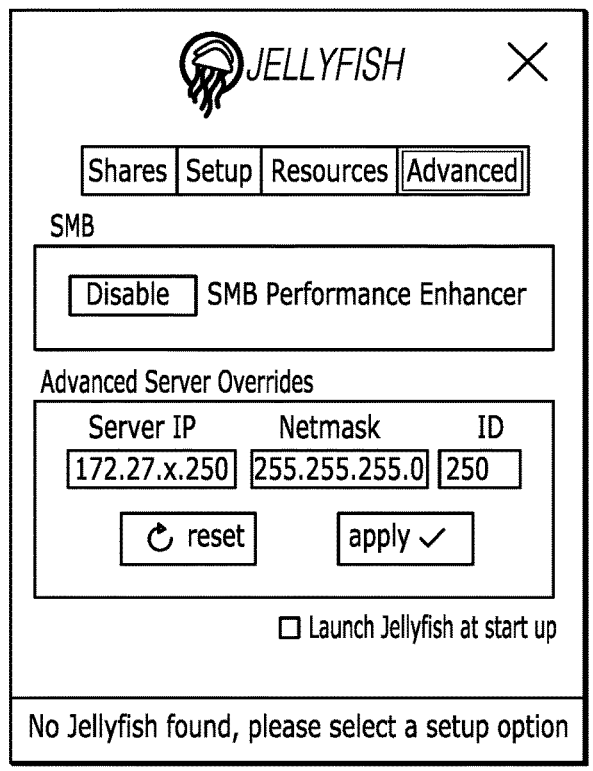

Once the user enters the port number, the share application will look for the share storage server, e.g., Jellyfish, a NAS device, in FIG. 3C. Jellyfish is a share storage server available from LumaForge, Inc. of Burbank, Calif. If the share application is unable to locate the server, the user will be prompted to choose a setup option, FIG. 3D. The user will have the option of automatic setup or manual setup as shown in FIG. 3E. If the automatic setup fails, the user also has the option of manually setting up and locating the server, e.g., the Jellyfish NAS device. Choosing the manual option requires the user to enter the IP address, netmask and ID information as shown in FIG. 3F.

In an alternative embodiment, the share application automatically searches for the shared storage server, e.g., NAS device 100, to which a workstation is connected, automatically determines the Ethernet port of this connection and then automatically configures the client workstation for optimum file transfer with the NAS device.

Figure 3G:
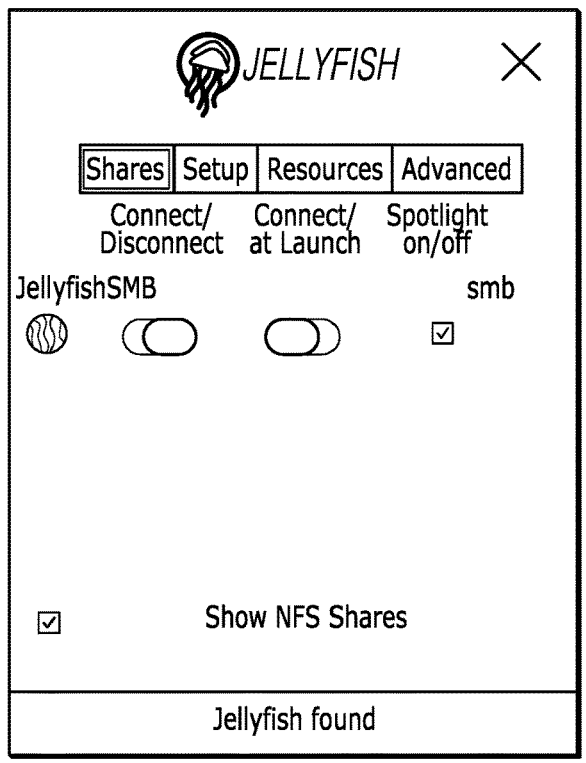

Once the configuration has been set, the user will be able to see the available shares as shown in FIG. 3G. Here the user can mount any of the available shares by turning on the appropriate switch.

In one embodiment of the present application, the host file entry is set so that instead of using an IP address to identify the server, e.g., NAS Device 100, the user just types in the name of the server, e.g., ShareStation or Jellyfish, in the workstations browser or Finder (for Mac OS workstations) or Windows Explorer. Because the name of the server is in the host file, the workstation will translate the server name, e.g., Jellyfish, into a proper IP address.

Mounting Shares: As mentioned, the share application enables an administrator to manage permissions of various potential users on the server side for various shares. Such permissions as read, write and execute are toggled ON/OFF for each user. When a particular user connects to the NAS device 100, he or she sees each share folder and may have permission to mount the folder to see and edit various files therein as permitted. By setting up these permissions in advance, the share application greatly simplifies the hierarchy of permissions for each share folder for multiple users, that previously would have required an IT professional to manage an access control list (ACL) involving numerous check boxes at the root level.

After configuration, auto or manual, the workstation user will be able to see the list of available shares and turn them on or off (mounting) using, e.g., a switch. In one embodiment of the present application, the available shares are mounted using a switch rather than a button. The switch also quickly tells the user whether a share is mounted or not as shown in FIG. 3G. For example, if a share is unmounted, e.g., because a wire came loose, the switch will change color to tell the user that the share is unmounted. The switch allows the share application to provide the real state of the server (even if there is a problem with the client OS, for example) to the workstation user.

Shares may be mounted manually or automatically, as indicated in FIG. 2 at 214 and 216. If the user must mount the shares manually, option 218 provides the ability to set the system to automatically mount the shares in the future.

Optimization Module: When a workstation is connected to an NAS, it does not yield optimal performance. The default settings on the client workstation are not optimized for maximizing throughput, reducing latency and increasing stability, i.e., default settings used by the client workstation's operating system are not optimal for file sharing between the client workstation and a shared storage server such as the NAS device 100. The best that has been done in the prior art is to manually configure client workstations in a hit and miss system for connection to a NAS. In general, such manual methods do not yield optimal settings. The methods provided herein allow an application residing on the client workstation, e.g., an optimization module in the share application of the exemplary system, to configure it optimally so that its connection to the NAS provides the optimal bandwidth, minimum latency and maximum stability for file sharing. The present system arrives at the optimal values by analyzing the client workstation, and connection settings between the client workstation and the server. If the server is connected to the client workstation via an adapter, the exemplary system also analyzes the connection settings between the client workstation and the adapter and/or the connection settings between the server and the adapter.

Figure 4:
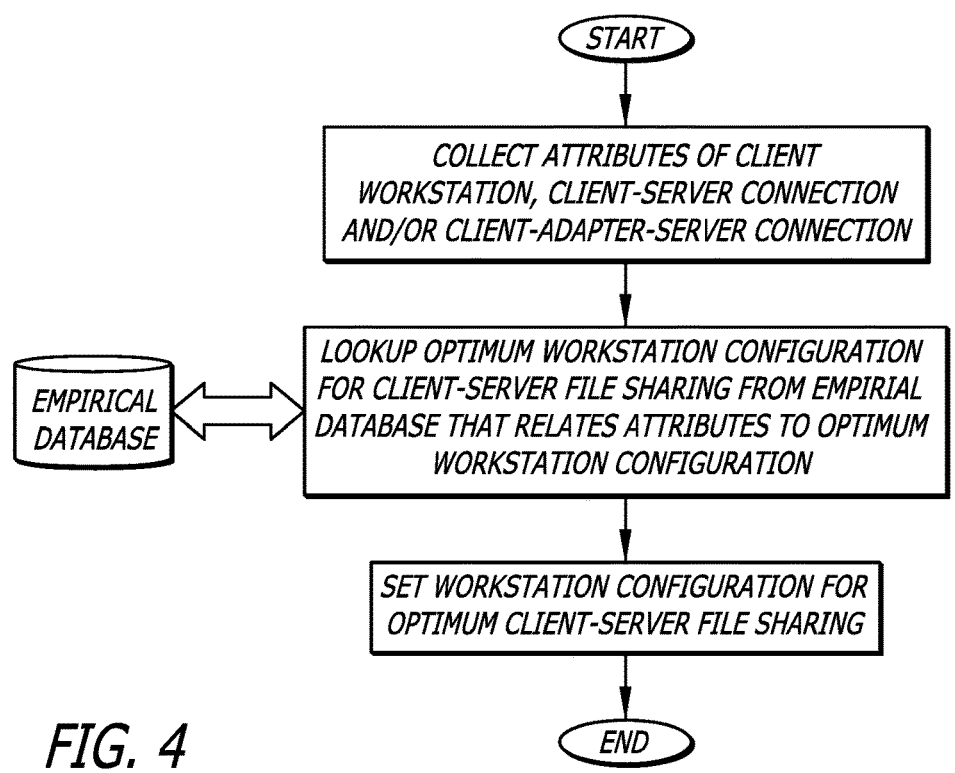
FIG. 4 is a flow chart of an exemplary embodiment of the optimization module of the exemplary system.

FIG. 4 illustrates the flow chart of an exemplary embodiment of the optimization module of the present application. As set forth above, prior to execution of the optimization module, the share application running on the client workstation has detected that the client workstation is connected to an NAS device. In a first process, the optimization module runs the system profiler and extracts various client workstations attributes, for example, characteristics of the CPU, the operating system, including its specific version, the characteristics and amount of RAM, and the type and speed of the connection between the workstation and the NAS device. In a second process, the optimization module runs an algorithm using client workstation attributes and an empirically determined database to determine the client workstation configuration that will be optimal for file sharing between the client workstation and the NAS server. In one embodiment, the algorithm uses the client workstation attributes to calculate a score. The score is then used to look up an empirical database to determine the optimal settings for the client workstation configuration to provide maximum bandwidth, minimum latency and maximum stability. In one embodiment, the look-up process is implemented in a series of IF-THEN statements. In a third process, the optimization module runs a process to set the client workstation configuration settings to the optimal settings. In one embodiment, the settings that the optimization module optimizes are NFS and SMB settings such as ReadAhead, the size of the read/write buffer, the NIC buffers, ring size, MTU size, etc.

Thus, the present application provides a method of dynamic optimization of the client workstation configuration when the client workstation is connected to a NAS. The system automatically configures the client workstation to provide optimum performance with respect to bandwidth, latency and stability for file exchange between a NAS server, that of the present system or another NAS server, and the workstation. The optimized settings maximize throughput, reduce latency and increase stability.

The optimization module of the exemplary system can be used for various workstation-NAS device connection types and speeds. The optimization module includes the optimum configuration settings for a workstation connected to an NAS device via an intermediate adapter, e.g., a Thunderbolt adapter. Thunderbolt adapters combine PCI Express (PCIe—high-speed serial computer expansion bus standard) and DisplayPort (DP—digital display interface) into two serial signals, and additionally provides DC power, all in one cable. Up to six peripherals may be supported by one connector through various topologies. Exemplary Thunderbolt adapters are Sonnet, Promise, SmallTree, etc. In another embodiment, the module can be used where the workstation is directly connected to the NAS device. For example, the next generation Mac computers announced by Apple Computers will eliminate the need for an external adapter and allow the NAS device to be directly connected to such Macs. Because the attributes of the network cards on the Mac Pro or the iMac are known, the optimum configuration settings for the known Mac network cards have been determined and the optimization module can be implemented where a Mac is directly connected to an NAS device without an external intermediate adapter.

Metadata Share Volume: In some embodiments of the present application, the shared storage server of the system, e.g., NAS device 100, comprises a high speed, high performance flash storage pool 181. This may be comprised of, for example, NVMe/SSDs. The present system separately designates at least a part of this storage pool as a separate share S1 Storage Pool 186, which means that it is separately exposed to a client workstation as a separate share volume, for example, as a metadata share volume. Many applications, including, without limitation, NLEs, audio editing applications, and compositing applications, require their own caches for storing small files such as libraries, projects or database attributes. For example, Final Cut Pro X requires that the user specify a cache for the program. On a stand-alone workstation not connected to a shared storage device, the user usually specifies the workstations local storage as the cache. However, this will not work in a collaborative workflow because the cache contents will only be available to the user on that workstation. The exemplary system permits such collaborative workflow by providing the metadata share volume, e.g., S1 Storage Pool 186. Multiple Final Cut Pro X users connected to the shared storage can now work collaboratively by mounting the metadata share volume and specifying that the cache for the Final Cut Pro X (FCP X) program is the metadata share volume, e.g., S1 Storage Pool 186. Similarly, the metadata share volume, once mounted on a workstation, can be set as the cache for other NLE programs such Premiere Pro, Resolve, etc., or for other applications that require their own caching such as audio editing programs, or compositing applications, which need layer caches, render caches, etc. When user applications require one or more, and sometimes several, small files such as libraries, project files, etc., the metadata share volume of the exemplary system provides a high speed, low latency share volume for such files and, thus, makes collaborative workflow feasible. When a number of client workstations are connected to the same NAS device and working on the same project (say using FCP X)—the latency would be significantly improved if they all mounted the metadata share volume and instructed the FCP X to use this volume for caching. The latency can be reduced, for example, from a millisecond to a microsecond. In summary, the metadata share volume is visible as a separate share in the share application of the exemplary system. Therefore, if needed the metadata share volume, e.g., S1 Storage Pool 186, can be mounted and used by the client workstation for various applications where the workflow would benefit from shared caching.

In an exemplary embodiment, the server device 100 includes at least ten Gigabit Ethernet network adapters having integrated Gigabit Ethernet MAC and PHY layer functions. Such a system—along with the storage subsystem diagramed—allows for sufficient data transfer between the server and workstations to support multiple NLE workstations or other network capable hardware such as, but not limited to, encoders, playout servers, and video recorders that play from and record to devices such as hard drives simultaneously accessing media files on the storage subsystem.

Cache memory: Also called CPU memory, cache memory is high-speed static random-access memory (SRAM) that a computer microprocessor can access more quickly than it can access regular random-access memory (RAM). Cache memory is typically integrated directly into the CPU chip or placed on a separate chip that has a separate bus interconnect with the CPU. The purpose of cache memory is to store program instructions and data that are used repeatedly in the operation of programs or information that the CPU is likely to need next. The computer processor can access this information quickly from the cache rather than having to get it from computer's main memory. Fast access to these instructions increases the overall speed of the program.

Predictive caching: As seen in FIG. 1, NAS storage device 100 further comprises a predictive caching module 140. In some embodiments, the predictive caching module is embodied as a software module that executes on processor(s) 120. In such embodiments, predictive caching module 140 executes as a background process to determine the type of files stored on NAS storage device 100 that are being accessed by client workstations. In some embodiments, predictive caching may be used to improve transfer performance. In one embodiment, for example, tracking logic may be used to track the type of file being accessed by the client and/or the type of operation being performed on the file by the client. The results of the tracking analysis may then be used to ensure that certain data files, e.g., image sequence files, are pre-read into the cache or moved from slower storage pools to a faster NVMe/SSD pool to allow faster access by the client.

Figure 5:
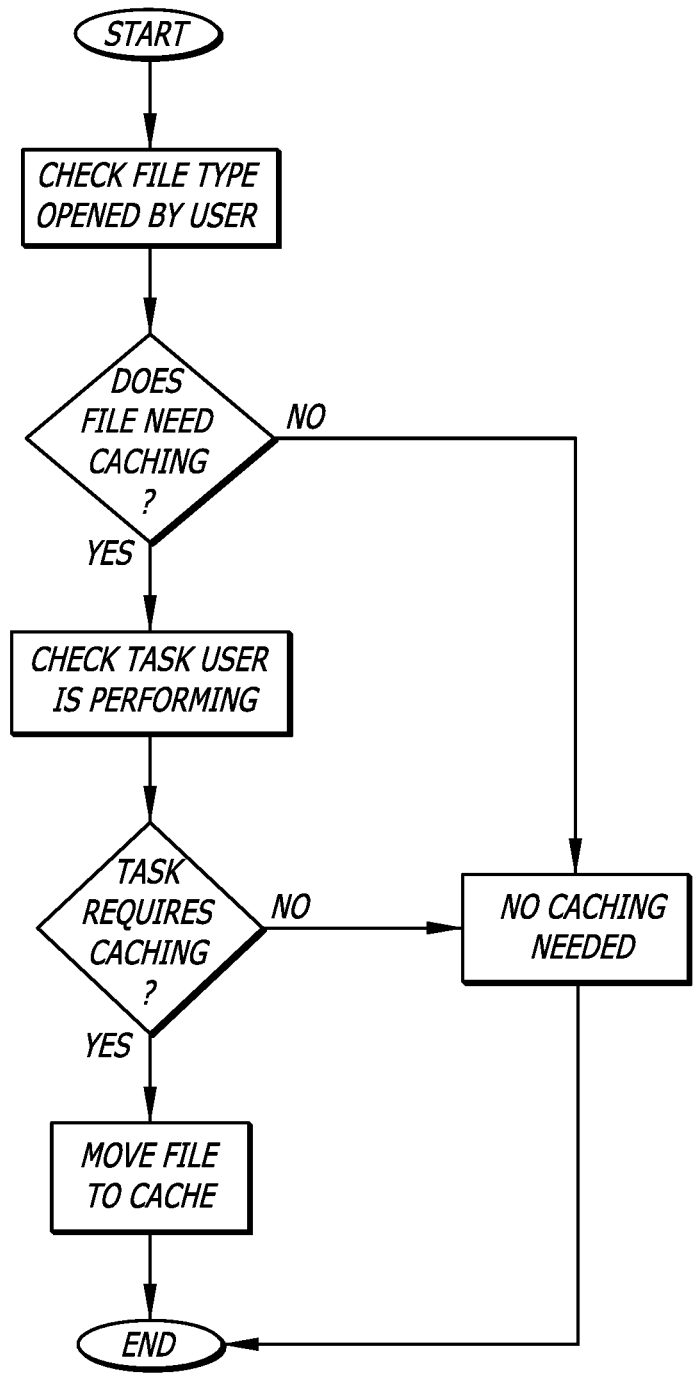
FIG. 5 is a flow chart of an exemplary embodiment of the predictive caching module of the system.

A flow chart of an embodiment of predictive caching is illustrated in FIG. 5. When a client workstation is connected to the server, and the client workstation initiates a request, the module first runs a process, which determines the type of file being requested by the client workstation. If the type of file is such that it does not need caching, for example a document file, the module exits. If the type of file is such that caching would improve performance, for example, an image sequence file, the module runs a process to determine the type of action that the client workstation is performing on the file. If the type of action is such that it does not need caching, for example the action is browsing file names, the module exits. If the type of action is such that caching would improve performance, the module runs a process to move the file into the cache. Various other techniques of intelligent caching may also be utilized according to embodiments of the present application.

As also seen in FIG. 1, NAS storage device 100 may further comprises a control module 150 that controls the operation of predictive caching module 140 in response to file access requests from client workstation.

In one embodiment, the NAS server 100 of the exemplary system set forth herein provides a plug-and-play type (mobile) shared storage servers that can be used by a small to mid-sized groups of editors, VFX artists, colorists, and graphic designers to quickly and efficiently share projects and collaborate. In this embodiment the shared storage server functions like a direct-attached storage. It can be preconfigured. Each client workstation can run the share application of the exemplary system to mount and connect to the mobile shared storage server. Once the shared storage server has been mounted, the system can auto-mount every time after that. The present system comprises features such as a single click button that repairs FCPX libraries and allows for relinking missing proxies. The mobile shared storage server in one exemplary embodiment can generate over 1600 MB/s of sustained bandwidth, and its tower and rack clock in at over 7200 MB/s. The system operates with minimal latency. The system uses state-of-the-art parity options and error-correcting technology to provide data security. The system is fully customizable according to the workflow needs of clients.

As shown in FIG. 6, another computing workflow environment in which the present system may be implemented includes a server system comprising three storage pools connecting multiple client workstations, e.g., video-editing client workstations, HD/sound workstations, VFX workstations. The media data can flow between the server and the workstations via a switch device that provides 1, 10, 25, 40, 50 and 100 Gb Ethernet ports. This switch can provide wired connections directly to various workstations to provide the required bandwidth, or through another switch (1 Gb Ethernet), which can then provide wired connections to various workstations that do not require that high a bandwidth.

As can be seen in FIG. 6, the server system comprises three storage pools: a flash pool comprised of SSDs, preferably NVMe/SSDs, a primary pool comprising spinning disk arrays and an archive pool comprising spinning disk arrays. The spinning disk arrays can be comprised of, for example, Ultrastar Helium hard disks with a 12 Gb SAS interface. The head unit, equivalent to the memory 130 of FIG. 1 comprises 10, 40 and 100 Gb Ethernet ports. The head unit is connected via a 100 Gb Ethernet connection to a main switch, Main Switch (1/10/25/40/50/100 GbE), that contains 1, 10, 25, 40, 50 and 100 Gb Ethernet ports. The main head unit is connected to an archive head unit via a 40 Gb Ethernet connection.

In the embodiment shown, the Main Switch is connected to a second switch, Secondary Switch (1 GbE), via a 10 Gb Ethernet connection, wherein Secondary Switch has multiple 1 Gb Ethernet ports. Secondary Switch can provide 1 Gb Ethernet connections to clients such as HD producers, or sound producers for them to access the NAS. Secondary Switch enabling server communications with the client workstations may comprise a Gigabit switch device such as provided by SMC® (Irvine, Calif.) that supports "Gigabit over Copper" Ethernet as well as "Jumbo Frames" (defined by a packet size or Maximum Transmission Unit—MTU—of 9000). This enables workstations to function at full Gigabit speeds over Ethernet cables that allow for maximum data throughput over the network and minimum use of CPU resources both by the server and workstations in order to support network transactions.

In the embodiment shown, Main Switch provides a 10 Gb Ethernet connection to editorial workstations. Further, Main Switch provides a 25 Gb Ethernet connection to VFX workstations and provides a 40 Gb Ethernet connection to workstations for coloring/finishing workflow or from which media is to be ingested, and a 10 Gb Ethernet connection to a media asset manager (MAM) server/computer. Main Switch may comprise a Gigabit switch such as that provided by SMC® (Irvine, Calif.) that supports "Gigabit over Copper" Ethernet as well as "Jumbo Frames" (defined by a packet size or Maximum Transmission Unit—MTU—of 9000). In the illustrated embodiment, the connections between storage pools are 12 Gb serial attached SCSI (SAS) connections. The exemplary embodiment is compatible with 1/10/40 & 25/50/100 GbE connections, expandable up to 100+PB, can provide up to 12,000 MB/s bandwidth, supports many different types of file protocols including, NFS, SMB/AFP/iSCSI, and is optimized for NLEs such as FCPX, Adobe CC, Resolve, AVID. With the wide range of Ethernet connections, the NAS can support complex workflows, e.g., one that require editors, VFX artists, Colorists, graphic designers and an audio team to work collaboratively on the same project. The NAS also offers high availability through the use of redundant head units, as well as various nearline and backup options.

Thus, in the embodiment of FIG. 6, the present application provides a post-production server that supports a 100 Gigabit Ethernet backbone, which provides an adequate amount of bandwidth with minimal latency and allows various clients to have the necessary connection type to match their workflow whether that's 1/10/25/40 or 50 GbE.

DaVinci Resolve: An exemplary digital mastering system that may be incorporated into the present system is the DaVinci Resolve available from Blackmagic Design Pty. Ltd. of Port Melbourne, Australia. DaVinci Resolve is a scalable GPU-based color grading and digital mastering system which offering multiple levels of acceleration, features and capabilities, providing colorists with exacting and intuitive color control over static or moving objects.

Preloaded DaVinci Resolve Database: In one aspect of the present application the DaVinci Resolve Database is preloaded on a shared storage server, e.g., NAS device 100 of FIG. 1. DaVinci Resolve is an NLE that at its heart has a database, which stores everything about a project, including user's preferences, and perhaps most importantly user's actual corrections and grades. For collaborative workflows, e.g., a facility with multiple Resolve workstations or for an independent colorist with multiple computers, there is a need for having a shared database. With a shared SQL database, every Resolve computer can point to the same database, and can access the same version of the project, without the export/import problems or the hassles of managing multiple versions of the same project. Using a shared SQL database allows users to leverage Resolve's collaboration features, which allow multiple colorists, editors and assistants to not only work on the same project at the same time, but actually be working on the same timeline at the same time.

In the prior art, the practice is to dedicate a separate computer to act as the database server. For example, this could be 2012 i7 Mac Mini. The computer used as the database server should have a permanent static IP on the network. On the machine used as the database server, PostGreSQL should be installed. The machine will also need to be connected by wires, for example, to a shared storage device directly or through a switch, that can then fan out to the various Resolve users. The Resolve database will then need to be configured so that it can be shared over the network, all the while with no guarantee that this workflow setup is configured for optimal bandwidth, latency and stability.

The present application obviates the above steps by storing the Resolve database on a RAID volume that is mounted into a shared storage server, for example, the NAS device 100. As shown in FIG. 1, the Storage Media 180 comprises a separate Resolve Db Pool 183 for storing the Resolve database. This can be exposed, for example, by the share application of the exemplary system, as a separate share volume to various workstations connected to NAS device 100, so that the users can then mount this volume to work collaboratively using Resolve. Thus, in one embodiment the exemplary system provides a preconfigured DaVinci Resolve postgres database stored on a RAID volume that is shared via the postgres protocol that allows clients to access the database as well as the NAS over the same connection RAID volume that provides redundancy and check summing. Because the NAS is configured for a fast network connection, and multiple client workstations can connect to the NAS, the exemplary system facilitates all of the advantages of collaborative workflow that a Resolve database provides without the need for a separate database server computer, wiring connections to switches or shared storage, and the need to configure the database on the database server computer.

Digital content creation offers the ability to work together in ways that were never possible before, so that work can be done collaboratively, whether it involves a commercial, corporate piece, feature film, or web spot. Shared storage servers as set forth herein allow teams of every size to enjoy the benefits of shared storage and collaborative workflow that heretofore were out of reach or impractical. Such systems allow users to work natively and iterate quickly. A single shared storage platform for ingest, editorial, VFX, finishing, and archive such as the ones set forth here means quicker turnaround and transparent media management.

In another embodiment, the present application comprises a shared storage server to store media, NLE, e.g., FCP X, Libraries and Cache folders, and all other assets that are needed for post processing. A storage system disclosed herein can work in demanding applications. An exemplary system may provide a 100 TB effective and fully expandable enterprise network attached storage (NAS) system with high redundancy and high-availability for 24 client connections, 12 connections over 10 Gig SFP+ to an existing fiber channel network for the editing stations and the audio and ingest stations, and 12 connections over Gigabit Ethernet to an existing Cath network for extra ingest, titling and graphics machines, Open Directory and system administration. The system can deliver sufficient sustained bandwidth to enable, for example, 5 editing rooms cutting, rendering and exporting heavy multicam projects in FCP X at the same time without any latency, plus one or more audio stations running video and multichannel audio from the server while media was ingested to the server over high-speed connections from different sources, all at the same time. Moreover, the shared storage server can easily integrate with the clients existing IT systems, which may comprise, by way of example only, MacPros running Mavericks and FCP X, MacPros running Lion for the AutoMotion software, different other computers including Windows based PC, a network system, Archive and MAM servers, EVS servers etc. using different protocols. Furthermore, to the shared storage server uses the right protocol to store NLE libraries, e.g., Final Cut Pro X Libraries, so that bottlenecks in the data pipeline leading to latency and beach balls on client stations, will not result. The shared storage servers herein also allow all editing and ingest clients to perform high-speed file transfers to the server without affecting the sustained read bandwidth of any editing station, thus avoiding one of the biggest problems prior art NAS systems face in this kind of setup.

The shared storage solutions provided herein have been optimized to meet the demanding performance requirements NLEs, for example, the Final Cut Pro X Library Architecture and waveform/thumbnail caching and DaVinci Resolve database storage. This extensive NLE optimization, allows multiple users to seamlessly work with the user's libraries, projects and databases directly from the shared storage server and collaborate with other editors across all of the user's clients as if these user files lived directly on SSD storage. As mentioned, the NAS of the exemplary system supports both NFS and SMB protocols for file sharing.

Although embodiments of the present application may be described and illustrated herein in terms of a network attached storage (NAS) system, it should be understood that embodiments of this application are not so limited, but are additionally applicable to other types of shared storage servers. Furthermore, although embodiments of the present application may be described and illustrated herein in terms of devices connected over the Internet, it should it should be understood that certain embodiments are also applicable to other types of networks, including, for example, wide, metropolitan, and local area networks.

The shared storage servers of the present application are fully interoperable between and compatible with MacOS, Windows and Linux. They are optimized for FCPX, Premiere, AVID, Resolve, Motion, After Effects, Audition, Pro Tools, Logic. They support NFS, SMB, CIFS, iSCSI, FTP, SSH; are Thunderbolt 3 ready; support rsync and snapshot backups; support all major cloud backup platforms such as Dropbox; and can be remotely accessed over FTP or SSH.

Built upon a ZFS architecture, the operating system of the storage devices/servers disclosed herein is designed to provide maximum performance and data integrity with minimal management and maintenance. Through an easy to use GUI directory services (Active Directory, Open Directory, LDAP) can be enabled, snapshots and mirror volumes configured, encryption set, back up to the cloud performed, remote access provided over FTP, and many other useful features.

Although embodiments of this application have been fully described with reference to the accompanying drawings, it is to be noted that various changes and modifications will become apparent to those skilled in the art. Such changes and modifications are to be understood as being included within the scope of embodiments of this invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the invention has been described in its preferred embodiments, it is to be understood that the words which have been used are words of description and not of limitation. Therefore, changes may be made within the appended claims without departing from the true scope of the invention.

What is claimed is:

1. A method for configuring a client workstation with one or more settings for optimum bandwidth, latency and stability for file exchange utilizing SMB or NFS protocols over a local area network with a network attached storage device, the network attached storage device having a memory with audio and video media footage stored on the memory and an operating system, wherein optimum bandwidth, latency and stability are selected to optimize performance of non-linear editing (NLE) software running on the client workstation for the purpose of editing audio and video media footage stored on the network attached storage device, comprising:

connecting the client workstation configured to run non-linear editing (NLE) software to the network attached storage device;

using the network attached storage device to extract from the client workstation one or more attributes of the client workstation;

running an optimization module on the network attached storage device to calculate a score based on the one or more attributes of the client workstation;

using the score to consult a database comprising optimum configuration settings for the client workstation to determine the one or more settings for optimum bandwidth, latency and stability for file exchange of shares with the network attached storage device; and modifying the client workstation settings to be selected from the extracted one or more settings for optimum bandwidth, latency and stability for file exchange utilizing SMB or NFS protocols over a local area network with the network attached storage device shared storage server.

* * * * *